(12) United States Patent
Agrawal et al.

(10) Patent No.: US 10,388,280 B2
(45) Date of Patent: Aug. 20, 2019

(54) METHOD AND APPARATUS FOR MANAGING MULTIPLE VOICE OPERATION TRIGGER PHRASES

(71) Applicant: Motorola Mobility LLC, Chicago, IL (US)

(72) Inventors: Amit Kumar Agrawal, Bangalore (IN); Satyabrata Rout, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 58 days.

(21) Appl. No.: 15/007,340

(22) Filed: Jan. 27, 2016

(65) Prior Publication Data

US 2017/0213559 A1 Jul. 27, 2017

(51) Int. Cl.
*G10L 15/22* (2006.01)
*G10L 25/51* (2013.01)

(52) U.S. Cl.
CPC .............. *G10L 15/22* (2013.01); *G10L 25/51* (2013.01); *G10L 2015/228* (2013.01)

(58) Field of Classification Search
CPC ....................................................... G10L 21/16
USPC ......................................................... 704/233
See application file for complete search history.

(56) References Cited

U.S. PATENT DOCUMENTS

| | | | | |
|---|---|---|---|---|
| 8,370,147 B2* | 2/2013 | Kennewick | ........ | G06Q 30/0261 704/257 |
| 8,831,957 B2* | 9/2014 | Taubman | .......... | H04M 1/72572 379/88.01 |
| 8,924,219 B1* | 12/2014 | Bringert | .............. | G06F 3/04842 704/275 |
| 2002/0067308 A1* | 6/2002 | Robertson | .............. | G01C 21/00 342/357.395 |
| 2006/0074651 A1* | 4/2006 | Arun | ....................... | G10L 15/22 704/233 |
| 2009/0089065 A1* | 4/2009 | Buck | ................... | B60R 16/0373 704/275 |
| 2009/0094029 A1* | 4/2009 | Koch | ................ | H04M 3/42221 704/246 |
| 2009/0204410 A1* | 8/2009 | Mozer | ..................... | G10L 15/30 704/275 |
| 2011/0093265 A1* | 4/2011 | Stent | ....................... | G10L 15/06 704/243 |
| 2011/0144999 A1* | 6/2011 | Jang | ................... | G06K 9/00892 704/270.1 |
| 2012/0101810 A1* | 4/2012 | Kennewick | ........ | G06Q 30/0261 704/9 |
| 2012/0136658 A1* | 5/2012 | Shrum, Jr. | ............. | G10L 17/00 704/231 |

(Continued)

*Primary Examiner* — Daniel C Washburn
*Assistant Examiner* — Timothy Nguyen
(74) *Attorney, Agent, or Firm* — SBMC (57) ABSTRACT

A method and apparatus for managing multiple voice operation trigger phrases includes an electronic computing device enabling a first voice operation trigger phrase and a second voice operation trigger phrase on the electronic computing device. The method further includes determining whether a context applies to the electronic computing device, loading the first voice operation trigger phrase upon determining that a first context applies to the electronic computing device, and loading the second voice operation trigger phrase upon determining that a second context applies to the electronic computing device.

20 Claims, 7 Drawing Sheets

(56) References Cited

U.S. PATENT DOCUMENTS

| | | | | |
|---|---|---|---|---|
| 2013/0006634 | A1* | 1/2013 | Grokop | G10L 17/10 704/245 |
| 2013/0275138 | A1* | 10/2013 | Gruber | G10L 13/00 704/260 |
| 2014/0039888 | A1* | 2/2014 | Taubman | H04M 1/72572 704/235 |
| 2014/0222436 | A1* | 8/2014 | Binder | G06F 3/167 704/275 |
| 2014/0229174 | A1* | 8/2014 | Graumann | G10L 15/22 704/231 |
| 2014/0244259 | A1* | 8/2014 | Rosario | G10L 15/19 704/254 |
| 2014/0249817 | A1* | 9/2014 | Hart | G10L 15/22 704/239 |
| 2014/0278389 | A1* | 9/2014 | Zurek | G10L 15/20 704/231 |
| 2014/0278413 | A1* | 9/2014 | Pitschel | G10L 15/063 704/243 |
| 2015/0039303 | A1* | 2/2015 | Lesso | G10L 15/28 704/233 |
| 2015/0302855 | A1* | 10/2015 | Kim | G10L 17/22 704/275 |
| 2015/0340040 | A1* | 11/2015 | Mun | G10L 17/22 704/246 |
| 2016/0253998 | A1* | 9/2016 | Iyer | G10L 15/22 704/275 |
| 2016/0379629 | A1* | 12/2016 | Hofer | G06F 17/277 704/257 |
| 2016/0379633 | A1* | 12/2016 | Lehman | G10L 15/22 704/275 |

* cited by examiner

METHOD AND APPARATUS FOR MANAGING MULTIPLE VOICE OPERATION TRIGGER PHRASES

FIELD OF THE DISCLOSURE

The present disclosure relates generally to voice operation of an electronic computing device and more particularly to loading one of multiple voice operation trigger phrases for the electronic computing device to make the voice operation trigger phrase active based on a context for the electronic computing device.

BACKGROUND

As electronic computing devices evolve in their functionality and sophistication, voice becomes a more popular mode of operation. Voice provides a convenient way to interact with devices without having to navigate hierarchical menu structures or graphic objects presented on displays. To effectively use voice to control a device, the device is voice enrolled to enable the device to recognize a user speaking a trigger phrase. Training the device to recognize the trigger phrase allows the device to respond to the user's voice commands.

While a user is generally free to choose a trigger phrase, some trigger phrases may not be optimal for all situations. A comical trigger phrase, for instance, may not be suited for a professional environment. A trigger phrase having certain sound characteristics may not be easily detected in certain types of ambient noise.

BRIEF DESCRIPTION OF THE FIGURES

The accompanying figures, where like reference numbers refer to identical or functionally similar elements throughout the separate views, form part of the specification and illustrate embodiments in accordance with the included claims.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The method and device components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for managing multiple voice operation trigger phrases. More specifically, an electronic computing device enables multiple trigger phrases to initiate a voice operation mode of the electronic computing device. The electronic computing device then loads to make active a specific trigger phrase of the multiple trigger phrases based on a context which applies to the electronic computing device. The loaded trigger phrase, for example, is preselected by a user or provides the best performance for the applicable context.

In accordance with the teachings herein, a method performed by an electronic computing device includes enabling a first voice operation trigger phrase. The electronic computing device detecting the first voice operation trigger phrase being spoken by a user while the first voice operation trigger phrase is loaded initiates a voice operation mode of the electronic computing device. The method additionally includes enabling a second voice operation trigger phrase. The electronic computing device detecting the second voice operation trigger phrase being spoken by the user while the second voice operation trigger phrase is loaded initiates the voice operation mode of the electronic computing device. The method further includes determining whether a context applies to the electronic computing device, loading the first voice operation trigger phrase upon determining that a first context applies to the electronic computing device, and loading the second voice operation trigger phrase upon determining that a second context applies to the electronic computing device.

Also in accordance with the teachings herein is an electronic computing device configured to manage multiple voice operation trigger phrases. The electronic computing device includes a voice enrolment module configured to facilitate voice enrolment of the electronic computing device to enable voice operation trigger phrases on the electronic computing device. The electronic computing device also includes a processing element operatively coupled to the voice enrolment module. The processing element is configured to enable a first voice operation trigger phrase on the electronic computing device. The electronic computing device detecting the first voice operation trigger phrase being spoken by a user while the first voice operation trigger phrase is loaded activates a voice operation mode of the electronic computing device. The processing element is also configured to enable a second voice operation trigger phrase on the electronic computing device. The electronic computing device detecting the second voice operation trigger phrase being spoken by the user while the second voice operation trigger phrase is loaded activates the voice operation mode of the electronic computing device. The processing element is further configured to determine whether a context applies to the electronic computing device, load the first voice operation trigger phrase upon determining that a first context applies to the electronic computing device, and load the second voice operation trigger phrase upon determining that a second context applies to the electronic computing device.

In a first embodiment, the electronic computing device further includes a global positioning system receiver operatively coupled to the processing element. The global positioning system receiver is configured to determine a geographic location for the electronic computing device, and the first context applying to the electronic computing device relates to electronic computing device being at a geographic location.

In a second embodiment, the electronic computing device further includes a microphone operatively coupled to the processing element. The microphone is configured to capture ambient noise, and the processing element is further configured to determine, from the captured ambient noise, a level of ambient noise. The first context applying to the electronic computing device relates to the level of ambient noise being greater than a threshold level of ambient noise.

In a third embodiment, the electronic computing device further includes a microphone operatively coupled to the processing element. The microphone is configured to capture speech, and the processing element is further configured to determine, from the captured speech, that an identified person is in proximity to the electronic computing device. The first context applying to the electronic computing device relates to the identified person being in proximity to the electronic computing device.

In a fourth embodiment, the electronic computing device further includes a camera operatively coupled to the processing element. The camera is configured to capture an image, and the processing element is further configured to determine, based on the captured image, that an identified person is in proximity to the electronic computing device. The first context applying to the electronic computing device relates to the identified person being in proximity to the electronic computing device.

An electronic computing device, also referred to simply as a device, is any electronic device that can be voice enrolled. Electronic computing devices include, but are not limited to, smartphones, tablets, phablets, laptops, home computers, bicycling and other sports computers, wearable computing devices, personal digital assistants, enterprise digital assistants, gaming devices, portable media devices, streaming devices, and television interfacing devices.

Voice enrolling a device means to enable a voice operation trigger phrase, also referred to simply as a trigger phrase, on the device. With a trigger phrase enabled, for example, the device will take a programmed action in response to detecting a user speaking the trigger phrase when the trigger phrase is loaded on the device. Loading the trigger phrase on the device makes the trigger phrase active on the device. In one embodiment, the device detecting the user speaking the loaded trigger phrase places the device in a mode to detect and/or process additional voice input. The device launches an application, for instance, upon detecting the trigger phrase, whereby the application is configured for voice operation.

When multiple trigger phrases are enabled on a device for some embodiments, the device makes a specific trigger phrase of the multiple trigger phrases active by loading the trigger phrase. To make another trigger phrase active on the device, the device unloads the active trigger phrase, for some embodiments, making it inactive, and loads the other trigger phrase in its place. Multiple trigger phrases include two or more trigger phrases.

In different embodiments, a trigger phrase includes one or more words spoken in one or more languages. The phrase "Achtung Smartphone" for instance, is a two-word trigger phrase with the first word spoken in German and the second word spoken in English. In other embodiments, the trigger phrase is made up partially or completely by uttered sounds or phonemes that do not represent defined words in any spoken language.

For some embodiments, a trigger phrase is a user-specific phrase individualized for a user. In a first embodiment, a device recognizes a generic or default trigger phrase when a user of the device speaks the generic trigger phrase in his or her own voice. The device does not recognize the trigger phrase when it is spoken by another person. In a second embodiment, the device recognizes a custom trigger phrase created by the user. In a third embodiment, the device recognizes the custom trigger phrase only if the custom trigger phrase is spoken by the user.

Figure 1:
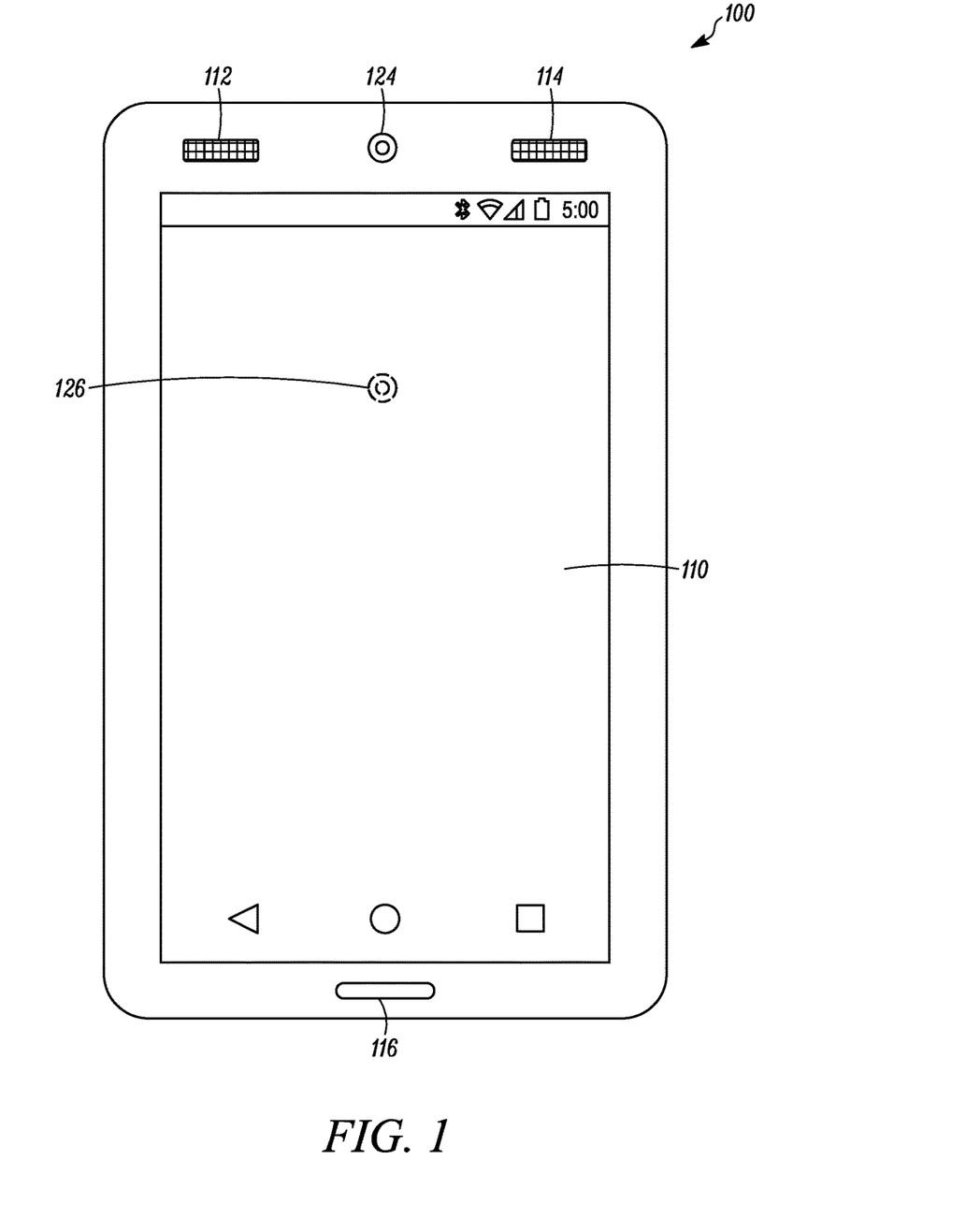
FIG. 1 shows an electronic computing device, in accordance with some embodiments.

FIG. 1 shows an electronic computing device, specifically a smartphone 100, which is referred to in describing included embodiments. The smartphone 100 is shown with a number of components, namely: a display 110, left 112 and right 114 stereo speakers, a microphone 116, and front 124 and back 126 cameras. These components 110, 112, 114, 116, 124, 126 enable the smartphone 100 to function in accordance with described embodiments. In other embodiments, different electronic computing devices having similar components are used to perform the functionality described herein with respect to the smartphone 100. These electronic computing devices and their included components are represented by and described with reference to FIG. 2.

Figure 2:
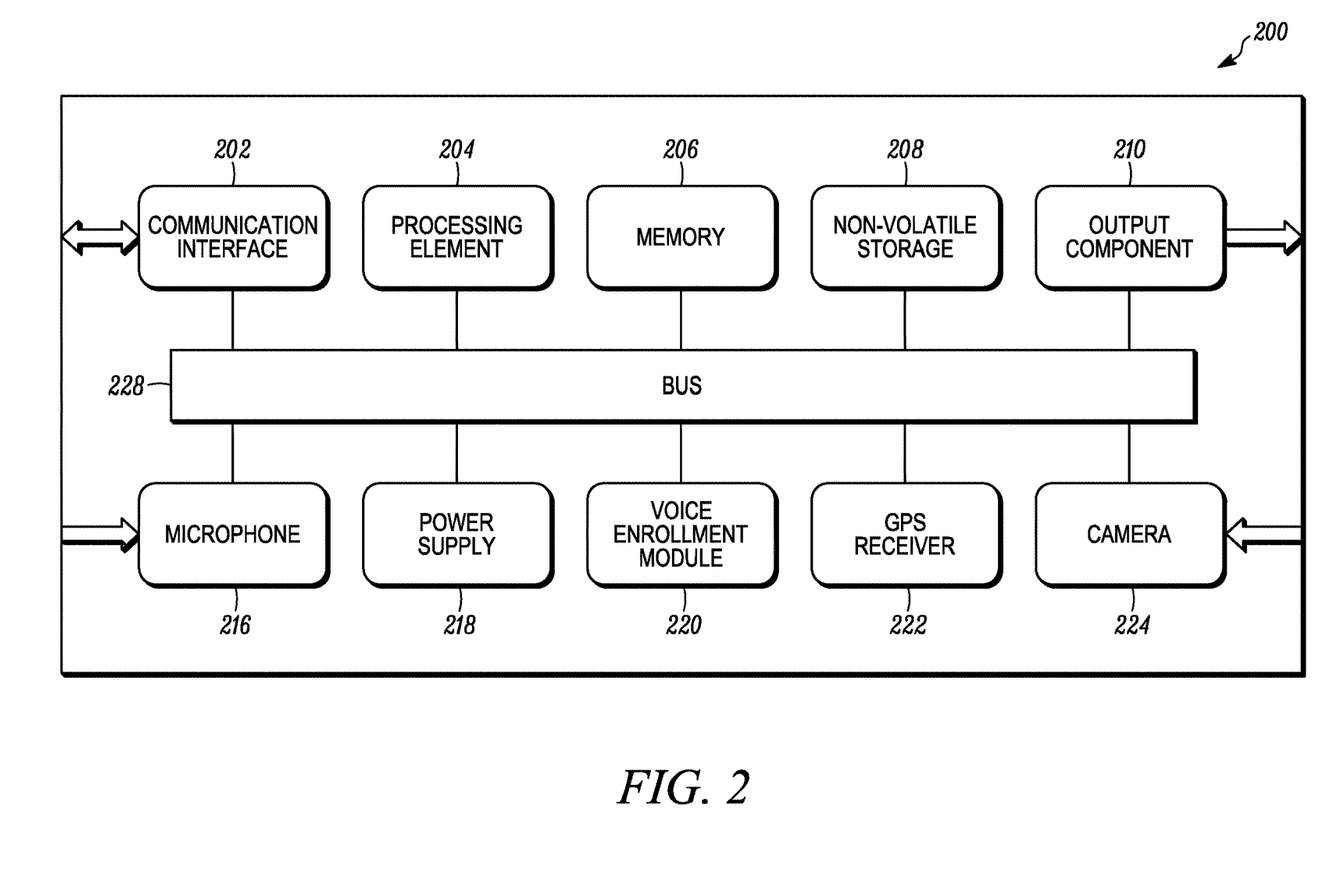
FIG. 2 shows a block diagram of an electronic computing device, in accordance with some embodiments.

FIG. 2 shows a block diagram of a nonspecific electronic computing device 200 in accordance with embodiments of the present teachings. For a particular embodiment, the electronic computing device 200 represents the smartphone 100. Included within the device 200 are a communication interface 202, a processing element 204, memory 206, non-volatile storage 208, an output component 210, a microphone 216, a power supply 218, a voice enrollment module 220, a global positioning system (GPS) receiver 222, and a camera 224, which are all operationally interconnected by a bus 228.

A limited number of device components 202, 204, 206, 208, 210, 216, 218, 220, 222, 224, 228 are shown within the device 200 for ease of illustration. Other embodiments may include a lesser or greater number of components in an electronic computing device. Moreover, other components needed for a commercial embodiment of an electronic computing device that incorporates the components 202, 204, 206, 208, 210, 216, 218, 220, 222, 224, 228 shown for the electronic computing device 200 are omitted from FIG. 2 for clarity in describing the enclosed embodiments.

The processing element 204, for instance, includes arithmetic logic and control circuitry necessary to perform the digital processing, in whole or in part, for the device 200 to manage multiple voice operation trigger phrases in accordance with described embodiments. For one embodiment, the processing element 204 represents a primary microprocessor, also referred to as a central processing unit (CPU), of the device 200. For example, the processing element 204 can represent an application processor or an application-specific integrated circuit (ASIC). In another embodiment, the processing element 204 is an ancillary processor, separate from the CPU, wherein the ancillary processor is dedicated to providing the processing capability, in whole or in part, needed for the components 202, 206, 208, 210, 216, 218, 220, 222, 224, 228 of the device 200 to perform at least some of their intended functionality.

The memory 206 provides storage of electronic data used by the processing element 204 in performing its functionality. For example, the processing element 204 can use the memory 206 to load programs and/or store files associated with managing multiple voice operation trigger phrases. In one embodiment, the memory 206 represents random access memory (RAM). In other embodiments, the memory 206 represents cache memory.

The non-volatile storage 208 provides the device 200 with long-term storage for voice data, metadata, applications, and other types of data used by the device 200 in performing the methods described herein. Voice data models for speech recognition, for instance, can be stored for a period of days or years when the processor 204 is not using the voice data models or when the processor 204 is powered down. For particular embodiments, the device 200 uses magnetic (e.g., hard drive) and/or solid state (e.g., flash memory) storage devices. In an embodiment, a portion of the non-volatile storage 208 is removable. For example, the device 200 uses a micro secure digital (microSD) card to store data files associated with multiple voice operation trigger phrases.

The communication interface 202 allows for communication between the device 200 and other devices configured to interact with the device 200 as part of the device 200 performing its described functionality. For one embodiment, the communication interface 202 includes a cellular transceiver to enable the device 200 to communicatively couple with other devices using one or more cellular networks. Cellular networks can use any wireless technology that, for example, enables broadband and Internet Protocol (IP) communications including, but not limited to: $3^{rd}$ Generation (3G) wireless technologies such as CDMA2000 and Universal Mobile Telecommunications System (UMTS) networks; $4^{th}$ Generation (4G) technologies such as LTE and WiMAX; or $5^{th}$ Generation (5G) technologies.

In another embodiment, the communication interface 202 includes a wireless local area network (WLAN) transceiver that allows the device 200 to access the Internet using standards such as Wi-Fi. The WLAN transceiver allows the device 200 to receive radio signals from similarly equipped electronic devices or a wireless access point (WAP), for instance, using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

For additional embodiments, the communication interface 202 includes a hard-wired connection to a network infrastructure that allows the device 200 to communicate electronically with other communicatively enabled hardware, such as a backend server. For example, the communication interface 202 includes a socket that accepts an RJ45 modular connector which allows the device 200 to be connected directly to a network router by category-5 or category-6 Ethernet patch cable. The communication interface 202 can also use a cable modem or a digital subscriber line (DSL) to connect to the Internet, and thereby to other devices, via an Internet service provider (ISP).

The output component 210 allows the device 200 to interface with a user by providing the user with information in a format accessible to the user. The display 110, for example, is an output component. The smartphone 100 can use the display 110 to provide a user with visual notifications or display icons with which the user can interact if the display is also configured as an input component. The speakers 112, 114 are also output components which can provide the user with aural notifications or other information.

The microphone 216 is an input component which allows the device 200 to capture sound. By speaking into the microphone 216, for example, a user can enable a trigger phrase on the device 200. By later speaking the trigger phrase while the trigger phrase is loaded on the device 200, the user can initiate a voice operation mode on the device 200. The device 200 can also use the microphone 216 to capture the speech of others. By processing speech captured by the microphone 216, the device 200 identifies an individual by his or her voice. Alternatively, the device 200 determines that the captured speech does not belong to the user. From the strength of a voice the microphone 216 captures, the device 200 might determine how far from the device 200 the person speaking is located. To determine a type and/or level of ambient noise, the device 200 uses the microphone 216 to capture a sample of the ambient noise that is free of speech. The noise is then analyzed and measured to determine a category for the noise and to determine, given the level of the noise, if the noise will interfere with detection of the user speaking a trigger phrase.

The camera 224 is an input component which allows the device 200 to capture images. By processing the captured images, the device 200 can determine, for example, a location of the device 200, if individuals other than the user are present, the identities of the other individuals, and/or how far from the device 200 the individuals are located. In a first embodiment, the device 200 compares images of its surroundings captured by the camera 224 to reference images of a user's place of employment to determine the user is at work. In a second embodiment, the camera captures the images of three distinct faces which provide the device 200 with an indication that two individuals, in addition to the user, are in proximity to the device 200. In a third embodiment, the device 200 applies a facial recognition algorithm to a captured image of a face to determine that a specific identifiable individual is in proximity to the device 200. In a fourth embodiment, the device 200 determines, from the size of a face captured in an image and a zoom setting on the camera 224, the distance from the device 200 at which an individual is located.

The GPS receiver 222 is configured to provide the device 200 with location and time information using space-based navigation satellites. By using the GPS receiver 222, the device 200 can monitor its location as a function of time to determine velocities and trajectories. The device 200 traveling at 55 miles per hour (MPH) along a trajectory that follows a highway, for instance, provides an indication that the device 200 is traveling within a motor vehicle on the highway.

The voice enrollment module (VEM) 220 includes hardware used by the device 200 while the processing element 204 is executing algorithms and/or programs directed to voice enrolling the device 200 by enabling trigger phrases on the device 200. The VEM 220 may be co-located with the processing element 204, or implemented separately, as shown in FIG. 2.

The power supply 218 represents a power source that supplies electric power to the device components 202, 204, 206, 208, 210, 216, 220, 222, 224, 228 as needed, during the course of their normal operation. The power is supplied to meet the individual voltage and load requirements of the device components 202, 204, 206, 208, 210, 216, 220, 222, 224, 228 that draw electric current. For some embodiments, the power supply 218 is a wired power supply that provides direct current from alternating current using a full- or half-wave rectifier. For other embodiments, the power supply 218 is a battery that powers up and runs the device 200 or provides primary or backup power for specific components. For a particular embodiment, the battery is a rechargeable power source. A rechargeable power source for a server is configured to be temporarily connected to another power source external to the server to restore a charge of the rechargeable power source when it is depleted or less than fully charged. In another embodiment, the battery is simply replaced when it no longer holds sufficient charge.

Figure 3:
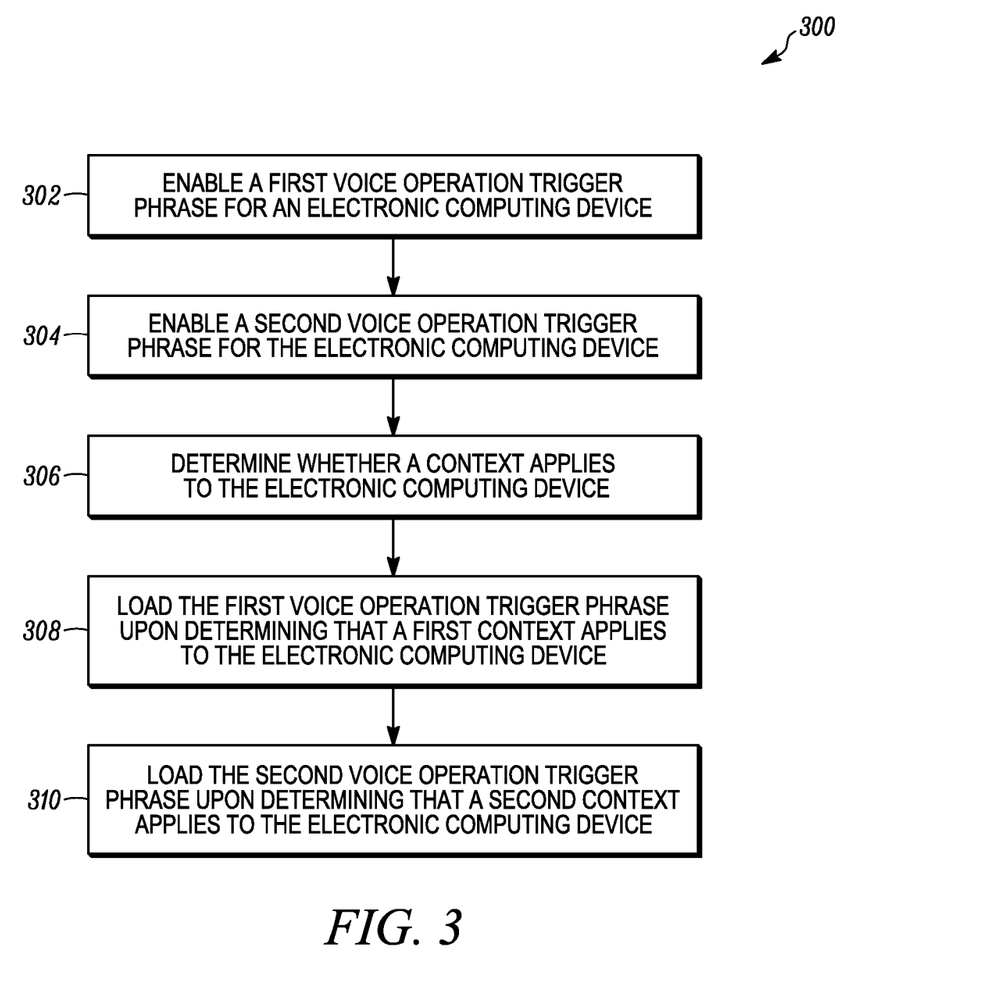
FIG. 3 shows a logical flow diagram illustrating a method for managing multiple voice operation trigger phrases, in accordance with some embodiments.

A detailed description of the functionality of the components shown in FIGS. 1 and 2 is provided with reference to the remaining figures. FIG. 3, for example, shows a logical flow diagram illustrating a method 300 performed by an electronic computing device, taken to be the smartphone 100, to manage multiple voice operation trigger phrases. The method 300 begins with the smartphone 100 enabling 302 a first voice operation trigger phrase. The smartphone 100 also enables 304 a second voice operation trigger phrase.

For some embodiments, the smartphone 100 enabling a trigger phrase includes the smartphone 100 configuring itself to detect a user speaking the trigger phrase. The smartphone 100 trains itself for speech recognition that involves speaker identification. For example, the smartphone 100 processes voice data to create a voice model file that allows the smartphone 100 to use a statistically-based speech recognition algorithm. The smartphone 100 uses a hidden Markov model (HMM), for instance, and approximates speech signals as piecewise stationary signals or short-time stationary signals on a brief time period, such as 10 milliseconds. In another embodiment, one or more voice model files used to enable trigger phrases are downloaded by the smartphone 100 from another electronic device, such as a server or another smartphone.

The method 300 continues with the smartphone 100 determining 306 whether a particular context applies to it. A context which applies to a device is a set of one or more circumstances or conditions which affect or determine an environment for the device. A non-exhaustive list of contexts that apply to the smartphone 100 in different embodiments includes: locations of the smartphone 100, people in proximity to the smartphone 100, a type and/or level of ambient noise at the smartphone 100, and an activity of a user of the smartphone 100. Upon determining that a particular context applies to the smartphone 100, the smartphone 100 responsively loads a trigger phrase enabled on the smartphone 100. For some embodiments, the smartphone 100 first unloads a currently loaded trigger phrase prior to loading the trigger phrase associated with the applicable context.

The smartphone 100 loads 308 the first voice operation trigger phrase when determining that a first context applies to the smartphone 100, wherein the first trigger phrase is associated with the first context. For an embodiment, a trigger phrase being associated with a context means that a device on which the trigger phrase is enabled is programmed to load the trigger phrase upon determining that the context currently applies to the device. When the smartphone 100 determines that a second context is applicable, for instance, the smartphone 100 loads 310 the second voice operation trigger phrase. The method 300 is described in greater detail with reference to FIGS. 4, 5, 6, 7, and 8, which relate to specific contexts.

Figure 4:
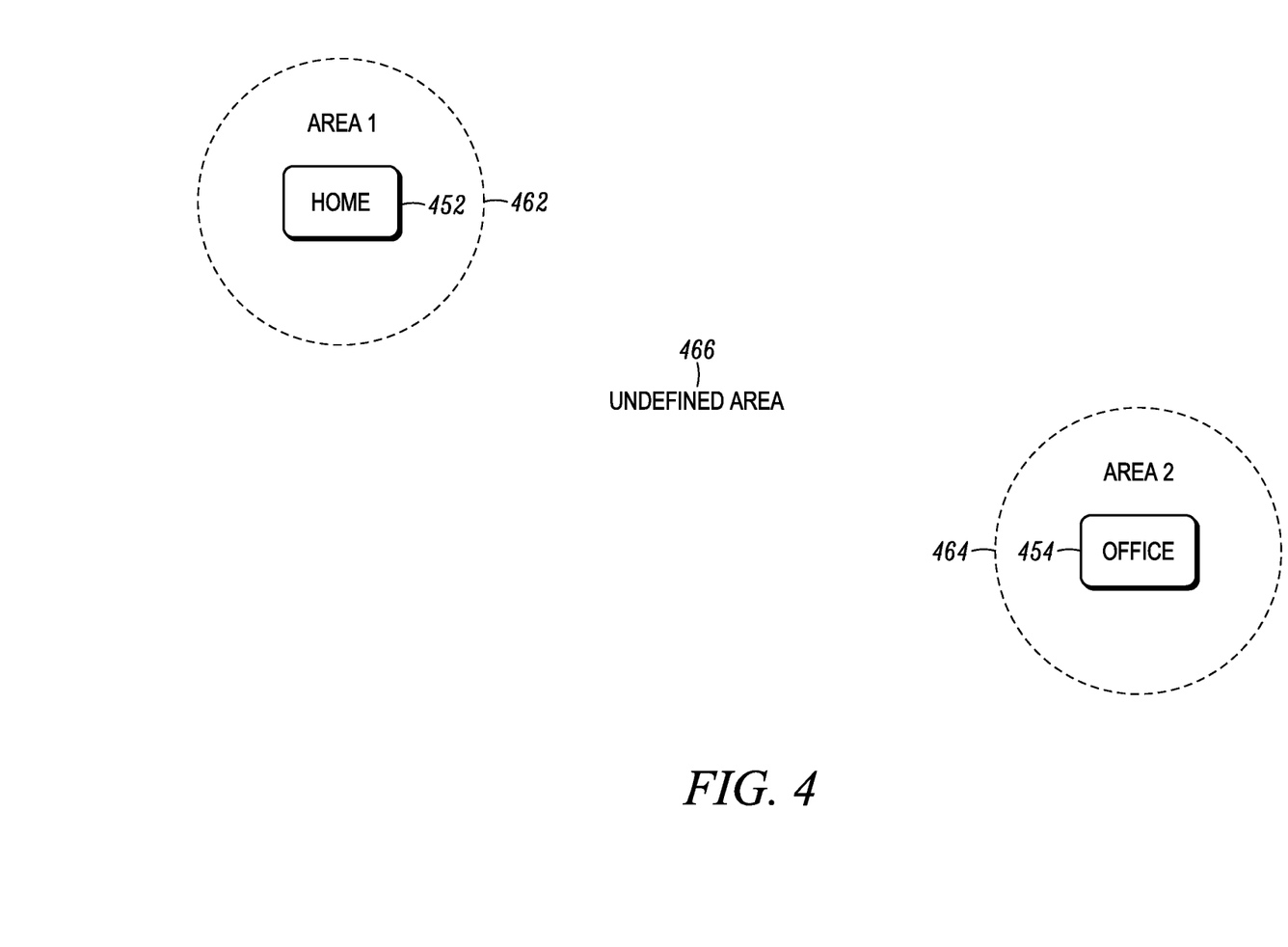
FIG. 4 shows a schematic diagram of location contexts for an electronic computing device, in accordance with some embodiments.

FIG. 4 shows a schematic diagram of location contexts that apply to the smartphone 100 loading enabled trigger phrases. Indicated at 452 is a residence or home of a user of the smartphone 100. A circle encloses a geographic area 462 within which the home 452 is located. A place of employment or office of the user is indicated at 454, which is located within a geographic area 464 with another circular perimeter. An undefined area 466 corresponds to the smartphone 100 being outside both the geographic area 462, defined for the user's home, and outside the geographic area 464, defined for the user's office. A context applying to the smartphone 100 means the smartphone 100 is located within a geographic area.

In an embodiment, the first context applies to the smartphone 100 when the smartphone 100 is at the residence 452 of the user, which occurs when the smartphone 100 is located within the geographic area 462. For example, the smartphone 100 is within the geographic area 462 when a location of the smartphone 100 as determined by the GPS receiver 222 is within a radial distance of stored geographic coordinates that define the center of the residence 452. When the user is at home with the smartphone 100, the first context applies and the smartphone 100 loads 308 the first trigger phrase. The first trigger phrase, for example, is the trigger phrase the user chooses to have loaded while at home. The first trigger phrase might be the user's preferred or favorite trigger phrase.

The second context applies to the smartphone 100 when the smartphone 100 is at the user's place of employment 454, which occurs when the smartphone 100 is located within the geographic area 464. When the second context applies, the smartphone 100 unloads the first trigger phrase and loads 310 the second trigger phrase. The second trigger phrase, for example, the trigger phrase the user chooses to have loaded while at work. The second trigger phrase might be a more professional trigger phrase than the first trigger phrase.

For other embodiments, the second context applies to the smartphone 100 when the smartphone 100 is outside at least one geographic area. In one example, the smartphone 100 loads 308 the first trigger phrase when the user is at home 452 within the geographic area 462. Anywhere outside the geographic area 462, the second context applies to the smartphone 100, and the smartphone 100 responsively loads 310 the second trigger phrase. In another example, the first context applies to the smartphone 100 when the smartphone 100 is located within either the area 462 or the area 464. When the smartphone 100 is not at the user's home 452 or office 454, the second context applies to the smartphone 100, and the smartphone 100 responsively loads 310 the second trigger phrase.

In some embodiments, the smartphone 100 loads a trigger phrase associated with a particular context if the smartphone 100 fails to determine that any context associated with an enabled trigger phrase applies to the smartphone 100. For example, the smartphone 100 loads the first trigger phrase when the smartphone 100 fails to determine that the first context applies to the smartphone 100 and fails to determine that the second context applies to the smartphone 100. If the smartphone 100 determines that it is in the undefined area 466, then it loads 308 the first trigger phrase. For one embodiment, the smartphone 100 loads 308 the first trigger phrase even when the smartphone 100 is located within the area 464 if the smartphone 100 is unable to, for whatever reason, determine it is located in the area 464.

In different embodiments, the smartphone 100 enables a third trigger phrase and loads the third trigger phrase when the smartphone 100 fails to determine that the first context applies to the smartphone 100 and fails to determine that the second context applies to the smartphone 100. For one embodiment, when the smartphone 100 determines it is in the area 462, the first context applies and the smartphone 100 loads 308 the first trigger phrase. When the smartphone 100 determines it is in the area 464, the second context applies and the smartphone 100 loads 310 the second trigger phrase. If, however, the smartphone 100 positively determines it is outside the areas 462 and 464 at a specific location in the undefined area 466, then the smartphone 100 loads the third trigger phrase.

For another embodiment, the smartphone 100 is located in either area 462 or area 464, but the smartphone 100 is unable to determine it is located in either of the areas 462, 464. The smartphone 100 is inside an office room, for example, that prevents the GPS receiver 222 from gaining a lock on enough satellites to determine its position. In this case, the smartphone 100 loads the third trigger phrase. In a further embodiment, the third trigger phrase is a default trigger phrase. If the smartphone 100 is unable to determine that any context associated with an enabled trigger phrase applies to the smartphone 100, then the smartphone 100 loads the default trigger phrase.

Figure 5:
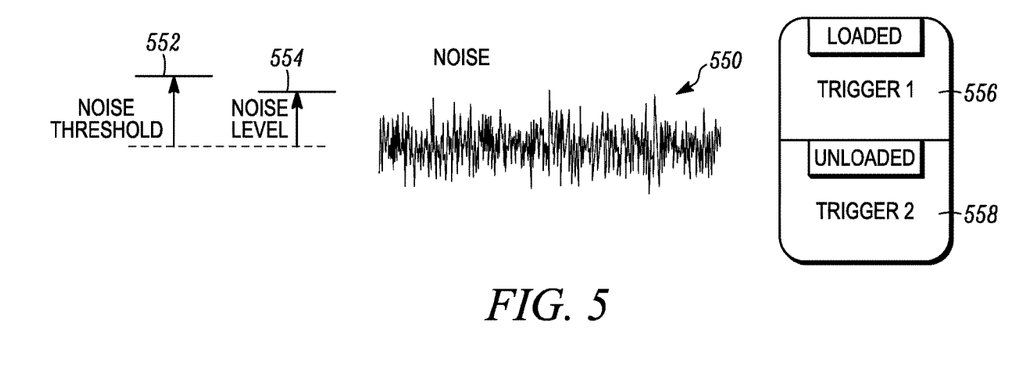
FIG. 5 shows a schematic diagram of a low-noise context for an electronic computing device, in accordance with some embodiments.
Figure 6:
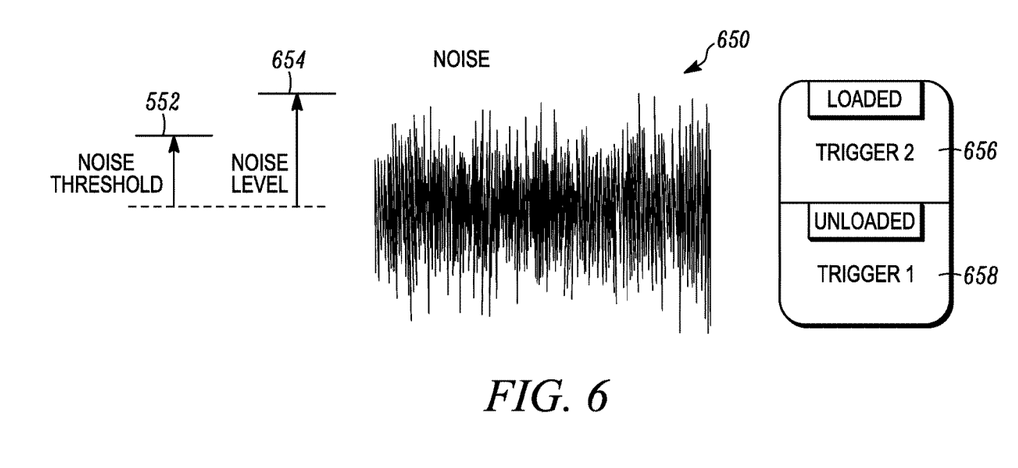
FIG. 6 shows a schematic diagram of a high-noise context for an electronic computing device, in accordance with some embodiments.

FIGS. 5 and 6 show schematic diagrams of noise contexts that apply to the smartphone 100 loading enabled trigger phrases. For some embodiments, a context applying to the smartphone 100 includes the smartphone 100 being subjected to ambient noise that adversely affects the smartphone 100 detecting a user speaking a trigger phrase. In one embodiment, a level of the ambient noise that adversely affects the smartphone 100 detecting the user speaking the trigger phrase is greater than a threshold level of ambient noise.

FIG. 5 shows a level 554 of ambient noise 550 below the threshold level 552 of ambient noise. As indicated at 556 and 558, respectively, the first trigger phrase is loaded and the second trigger phrase is unloaded on the smartphone 100. The smartphone 100 determines the threshold level 552 of ambient noise over time using the microphone 116 to make noise readings. The threshold level 552 of ambient noise is a measured level of noise below which the smartphone 100 can reliably detect the user speaking the first trigger phrase and above which the smartphone 100 can no longer reliably detect the user speaking the first trigger phrase. What quantifies reliability, for example, can be determined by an algorithm using statistical confidence intervals to calculate the threshold level 552 of ambient noise.

FIG. 6 shows that ambient noise 650 has increased to a new level 654 that exceeds the threshold level 552 of ambient noise. The user, for example, has stepped outside of a cab or an office building in a busy city with heavy traffic. Because the smartphone 100 can no longer reliably detect the user speaking the first trigger phrase, the smartphone 100 unloads the first trigger phrase and loads 310 the second trigger phrase, as indicated at 658 and 656, respectively. For a particular embodiment, the smartphone 100 determines that it can more reliably detect the second trigger phrase over the first trigger phrase in high-noise environments.

In other embodiments, the ambient noise adversely affecting the smartphone 100 detecting the user speaking the first trigger phrase relates to the ambient noise including a type of noise that obscures the smartphone 100 from detecting at least part of the first trigger phrase being spoken by the user. The spectral characteristics of ambient noise are different depending upon the source of noise. Traffic noise, for example, is of a different type than noise resulting from breaking ocean waves.

A particular type of noise affects the reliable detection of some trigger phrases more strongly than others. Breaking waves combined with wind on a beach might make it difficult for the smartphone 100 to detect a trigger phrase having softer vowels or an "sh" sound. The smartphone 100 would more reliably detect a trigger phrase having hard consonants, such as a "k" sound, under the same noise conditions. Compare the pronunciations of the words "shell" and "kite," for instance. When the smartphone 100 detects a type of ambient noise that makes detecting the first trigger phrase less reliable, the smartphone 100 unloads the first trigger phrase and loads 310 the second trigger phrase in its place.

Figure 7:
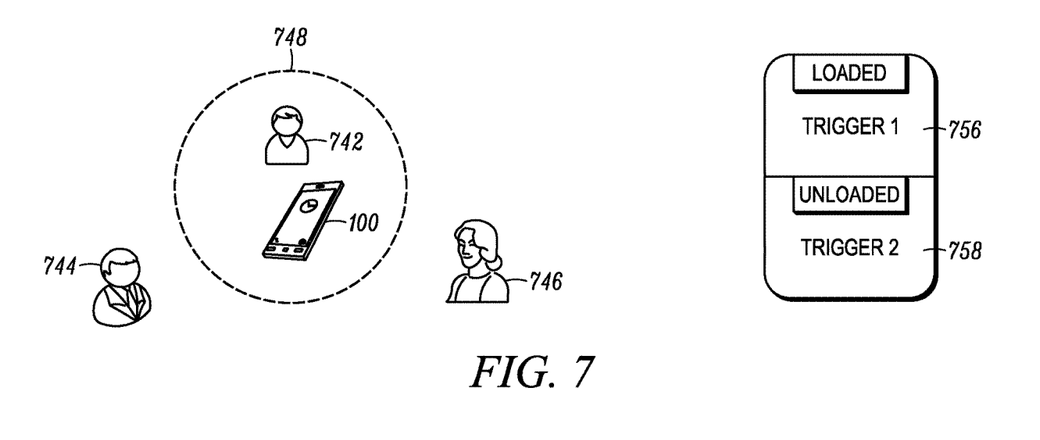
FIG. 7 shows a schematic diagram of a single-person proximity context for an electronic computing device, in accordance with some embodiments.
Figure 8:
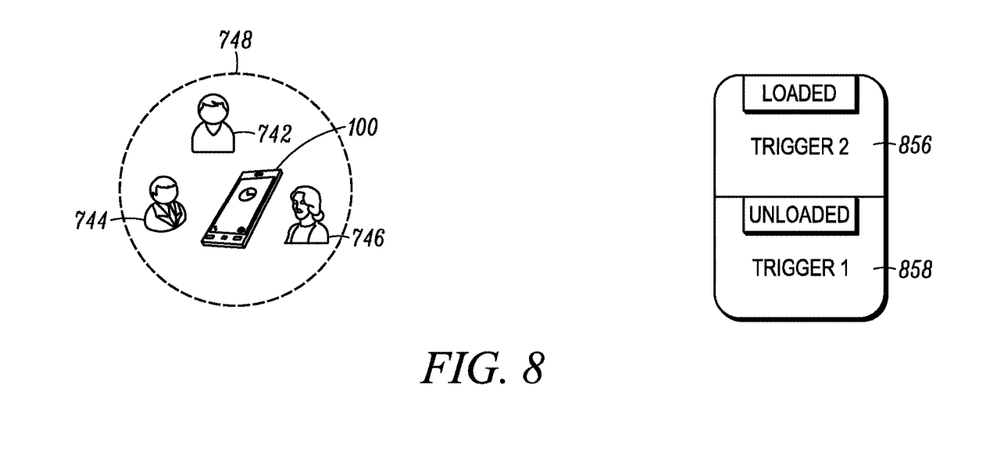
FIG. 8 shows a schematic diagram of a multiple-person proximity context for an electronic computing device, in accordance with some embodiments.

FIGS. 7 and 8 show schematic diagrams of proximity contexts that apply to the smartphone 100 loading enabled trigger phrases. For some embodiments, a context applying to the smartphone 100 includes at least one person in addition to a user of the smartphone 100 being in a vicinity of the smartphone 100. In one embodiment, the at least one person in addition to the user being in the vicinity of the smartphone 100 includes the at least one person being within a personal threshold distance of the smartphone 100.

FIG. 7 shows the smartphone 100 and its user 742 inside a circle 748 which indicates a personal threshold distance for the smartphone 100. The personal threshold distance might be a distance within which another person could easily overhear the user 742 speaking a trigger phrase. Alternatively, the personal threshold distance might be a distance within which the smartphone 100 begins to pick up the speech of others. This can be an issue if the user 742 is using a common or factory default trigger phrase which is ubiquitously spoken by other individuals.

In FIG. 7, no individuals in addition to the user 742 are within the vicinity of the smartphone 100. A person 744 and a person 746 are shown outside the personal threshold distance of the smartphone 100. Therefore, the first trigger phrase is loaded, and the second trigger phrase is unloaded, as indicated at 756 and 758, respectively.

In FIG. 8, the individual 744 and the individual 746 have moved within the personal threshold distance of the smartphone 100. The smartphone 100 responsively unloads the first trigger phrase and loads 310 the second trigger phrase, as indicated at 858 and 856, respectively.

In different embodiments, the smartphone 100 uses different methods or combinations of methods to determine how close an individual is to the smartphone 100, or more specifically, to determine whether the individual is within a personal threshold distance of the smartphone 100. For one method, the smartphone 100 determines a distance to an individual from a decibel level of the individual's voice as received by the microphone 116. Another method makes use of the smartphone's two cameras 124, 126 and is described with reference to FIG. 9.

Figure 9:
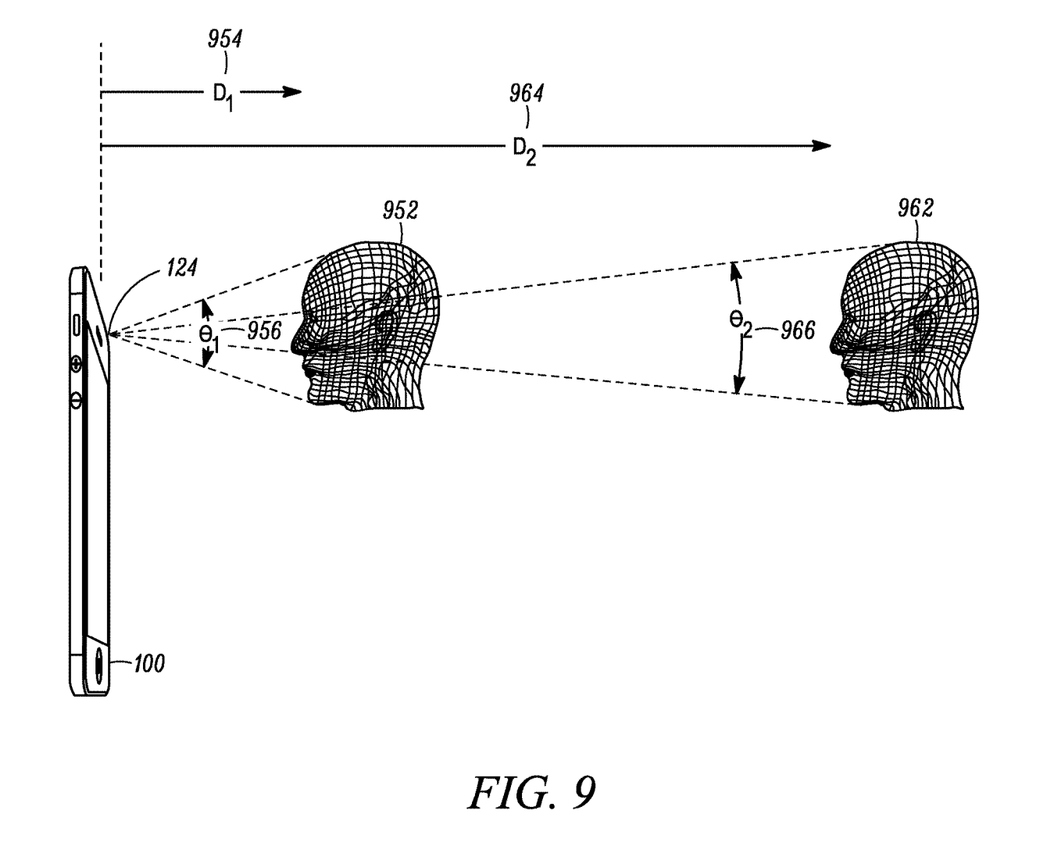
FIG. 9 shows a schematic diagram of an electronic computing device using a camera to determine distances, in accordance with some embodiments.

FIG. 9 shows a schematic diagram of the smartphone 100 using its front camera 124 to determine distances to individuals whose images are captured by the camera 124. A head 952 of an individual is shown at a distance $d_1$ 954 from the camera 124. At this close distance, the head 952 subtends an angle $\theta_1$ 956 that almost fills an area framed by a viewfinder of the camera 124 at a given zoom setting. For comparison, a head 962 of an individual is shown at a greater distance $d_2$ 964 away from the camera 124. At this greater distance, an angle $\theta_2$ 966 subtended by the head 962 with respect to the camera 124 is less than the angle $\theta_1$ 956. The head 962 fills a smaller portion of an image captured by the camera 124 as compared to a portion of an image filled by the closer head 952 at the same zoom setting. By calibrating the smartphone 100 to determine the distance of an individual as a function of the zoom setting of the camera 124 and of the portion of a captured image the individual's head fills, the smartphone 100 can determine if individuals are within the personal threshold distance of the smartphone 100.

In other embodiments, at least one person in addition to the user 742 being in the vicinity of the smartphone 100 means that at least one identified person in addition the user 742 is in the vicinity of the smartphone 100. An identified person is a specific individual rather than any individual. In FIG. 8, for example, the smartphone 100 does not load the second trigger phrase when the smartphone 100 is unable to identify either the individual 744 or the individual 746 shown within the personal threshold distance. Upon determining the individual 744 is the user's close friend Matt Smith, however, the smartphone 100 unloads the first trigger phrase and loads 310 the second trigger phrase. In a further embodiment, the smartphone 100 loads 310 the second trigger phrase after additionally identifying the individual 746 as Amy Pond, another friend to the user 742.

In one embodiment, the smartphone 100 uses its cameras 124 and 126 to identify individuals. The camera 126, for instance, captures an image of a face of a person in proximity to the smartphone 100. The processing element 204 then applies a facial recognition algorithm to the captured image, whereby the face in the image is compared against reference faces stored in a database for identifiable individuals. If a match is made between the face captured in the image and a reference face, then the person in proximity to the smartphone 100 is identified by the reference face.

In another embodiment, the smartphone 100 identifies an individual using speech recognition. Using the microphone 116, the smartphone 100 captures speech from the individual. The speech is then processed by the processing element 204 using a voice recognition algorithm. The captured speech is compared against voice models for known individuals. If a match is achieved between the captured speech and a voice model, then the smartphone 100 identifies the individual by the voice model.

In further embodiments, the smartphone 100 uses the communication interface 202 and an application executing on the processing element 204 to determine that an identified individual is in proximity to the smartphone 100. Some applications, for example, with permission from a user, send location information from a device on which the application is running to the device of a friend, family member, or employer running a similar application. When an application receiving such location information from other devices is executing on the smartphone 100, the smartphone 100 receives indications when known individuals are in proximity to the smartphone 100.

In addition to location, proximity, and noise contexts, other contexts in other embodiments determine which trigger phrase enabled on the smartphone 100 the smartphone 100 loads. In some embodiments, for example, the second context applies to the smartphone 100 when the smartphone 100 is in a motor vehicle. In determining the second context applies, the smartphone 100 responsively loads 310 the second trigger phrase. It might be that the second trigger phrase is better suited for use with road noise. For one embodiment, the smartphone 100 compares reference images of steering wheels and/or dashboards to images captured by the front 124 and/or rear 126 cameras of the smartphone 100 to determine the smartphone 100 is in a motor vehicle. For another embodiment, the smartphone 100 uses the GPS receiver 222 and access to maps to determine that the smartphone 100 is traveling along a roadway at approximately the posted speed limit for the roadway.

For different embodiments, the second context applies to the smartphone 100 when the smartphone 100 determines that a user is running with the smartphone 100. The smartphone 100 uses the GPS receiver 222 to determine the smartphone 100 is moving at approximately a runner's pace. Further, an accelerometer of the smartphone 100 records regular decelerations having a period that approximately coincides with a runner's footfalls. As the user's left and right heels alternately strike the ground, jarring forces are imparted to the smartphone 100, which are detected by the accelerometer as decelerations. When the user is physically exhausted or breathing heavily, the second trigger phrase may be easier to utter, as would be the case if the second trigger phrase were shorter than the first trigger phrase.

In additional embodiments, the second context applies to the smartphone 100 when the smartphone 100 determines it is at a scheduled meeting. A user keeps a calendar on the smartphone 100 and schedules on the calendar a business meeting for a particular conference room at a particular time. At the scheduled time, the smartphone 100 determines, using the GPS receiver 222, it is at the meeting location. Responsively, the smartphone 100 unloads the first trigger phrase and loads 310 the second trigger phrase. The second trigger phrase may be a more professional-sounding trigger phrase than the first or less likely to be a trigger phrase used by another meeting participant in the conference room.

Loading one of multiple trigger phrases enabled on a device based on a context which applies to the device enables a user of the device to use a more effective or a preferred trigger phrase given the context. As additional contexts become relevant, the user can enable additional trigger phrases on the device and define new rules for when the added trigger phrases are loaded.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by an electronic computing device, the method comprising:
    determining a geographic location of the electronic computing device;
    determining a context of the electronic computing device, the context including a first context corresponding to the electronic computing device being located within a first geographic area and at least a second context corresponding to a proximity of a person to the electronic computing device;
    loading and enabling a first voice operation trigger phrase based on the determining that the first context applies to the electronic computing device being located within the first geographic area, the first voice operation trigger phrase loaded to a processing element memory of the electronic computing device;
    detecting, by a camera of the computing device, an image that includes a representation of a portion of the person;
    determining, via logic executed by the electronic computing device, the proximity of the person to the electronic computing device by determining the proximity as a function of the image detected by the camera, a zoom setting of the camera, and a size of the representation of the portion of the person relative to a size of the image;
    loading and enabling a second voice operation trigger phrase based on determining that the proximity of the person is within a threshold distance of the electronic computing device such that the second context applies to the electronic computing device; and
    initiating a voice operation mode of the electronic computing device in response to audibly detecting one of the first voice operation trigger phrase while the first voice operation trigger phrase is loaded and enabled, or the second voice operation trigger phrase while the second voice operation trigger phrase is loaded and enabled.

2. The method of claim 1 further comprising loading the first voice operation trigger phrase when the electronic computing device fails to determine that the first context applies to the electronic computing device and fails to determine that the second context applies to the electronic computing device.

3. The method of claim 1 further comprising:
    enabling a third voice operation trigger phrase; and
    loading the third voice operation trigger phrase when the electronic computing device fails to determine that the first context applies to the electronic computing device and fails to determine that the second context applies to the electronic computing device.

4. The method of claim 1, wherein the electronic computing device being located within the first geographic area comprises the electronic computing device being at a residence of a user of the electronic computing device.

5. The method of claim 1, wherein the context of the electronic computing device further includes a third context associated with the electronic computing device being located within a second geographical area, and wherein the electronic computing device being located within the second geographic area comprises the electronic computing device being at a place of employment of a user of the electronic computing device.

6. The method of claim 5, wherein the context of the electronic computing device further includes a fourth context corresponding to the electronic computing device being located outside of the first geographic area and the second geographic area.

7. The method of claim 1, wherein the context of the electronic computing device further includes a third context corresponding to the electronic computing device being subjected to ambient noise that adversely affects the audibly detecting the one of the first voice operation trigger phrase or the second voice operation trigger phrase.

8. The method of claim 7, wherein a level of the ambient noise that adversely affects the electronic computing device audibly detecting the one of the first voice operation trigger phrase or the second voice operation trigger phrase is greater than a threshold level of ambient noise.

9. The method of claim 7, wherein the ambient noise that adversely affects the electronic computing device audibly detecting the one of the first voice operation trigger phrase or the second voice operation trigger phrase comprises a type of noise that obscures the electronic computing device from audibly detecting at least part of the first voice operation trigger phrase or the second voice operation trigger phrase.

10. The method of claim 1, wherein the person comprises at least one person in addition to a user of the electronic computing device being in a vicinity of the electronic computing device.

11. The method of claim 10, wherein the portion of the person comprises a head of the person in the image.

12. The method of claim 10, wherein the at least one person in addition to the user being in the vicinity of the electronic computing device comprises at least one identified person in addition the user being in the vicinity of the electronic computing device.

13. An electronic computing device comprising:
a voice enrolment module implemented at least partially in hardware and configured to facilitate voice enrolment of the electronic computing device to enable voice operation trigger phrases on the electronic computing device; and
a processing element operatively coupled to the voice enrolment module and configured to cooperate with the voice enrolment module to:
determine a geographic location of the electronic computing device;
determine a context of the electronic computing device, the context including a first context corresponding to the electronic computing device being located within a first geographic area and at least a second context corresponding to a proximity of a person to the electronic computing device;
load and enable a first voice operation trigger phrase based on the determining that the first context applies to the electronic computing device being located within the first geographic area, the first voice operation trigger phrase loaded to a processing element memory of the electronic computing device;
detect, by a camera of the computing device, an image that includes a representation of a portion of the person;
determine, via logic executed by the electronic computing device, a proximity of the person to the electronic computing device by determining the proximity as a function of the image detected by the camera, a zoom setting of the camera, and a size of the representation of the portion of the person relative to a size of the image;
load and enable a second voice operation trigger phrase based on determining that the proximity of the person is within a threshold distance of the electronic computing device such that the second context applies to the electronic computing device; and
initiate a voice operation mode of the electronic computing device in response to audibly detecting one of the first voice operation trigger phrase while the first voice operation trigger phrase is loaded and enabled, or the second voice operation trigger phrase while the second voice operation trigger phrase is loaded and enabled.

14. The electronic computing device of claim 13, wherein the context of the electronic computing device further includes a third context corresponding to the electronic computing device being subjected to ambient noise that adversely affects the audibly detecting the one of the first voice operation trigger phrase or the second voice operation trigger phrase.

15. The electronic computing device of claim 14, wherein the processing element is further configured to cooperate with the voice enrolment module to load a third voice operation trigger phrase in response to determining that the third context applies to the electronic computing device.

16. The electronic computing device of claim 13, wherein the person comprises at least one person in addition to a user of the electronic computing device being detected in a vicinity of the electronic computing device.

17. A system comprising:
a processing element; and
a data storage device operatively coupled to the processing and storing executable instructions that are executable by the processing element to:
determine a geographic location of an electronic computing device;
determine a context of the electronic computing device, the context including a first context corresponding to the electronic computing device being located within a first geographic area and at least a second context corresponding to a proximity of a person to the electronic computing device;
load and enable a first voice operation trigger phrase based on the determining that the first context applies to the electronic computing device being located within the first geographic area, the first voice operation trigger phrase loaded to a processing element memory of the electronic computing device;
detect, by a camera of the computing device, an image that includes a representation of a portion of the person;
determine, via logic executed by the electronic computing device, a proximity of the person to the electronic computing device by determining the proximity as a function of the image detected by the camera, a zoom setting of the camera, and a size of the representation of the portion of the person relative to a size of the image;
load and enable a second voice operation trigger phrase based on determining that the proximity of the person is within a threshold distance of the electronic computing device such that the second context applies to the electronic computing device; and initiate a voice operation mode of the electronic computing device in response to audibly detecting one of the first voice operation trigger phrase while the first voice operation trigger phrase is loaded and enabled, or the second voice operation trigger phrase while the second voice operation trigger phrase is loaded and enabled.

18. The system of claim 17, wherein the context of the electronic computing device further includes a third context corresponding to the electronic computing device being subjected to ambient noise that adversely affects the audibly detecting the one of the first voice operation trigger phrase or the second voice operation trigger phrase.

19. The system of claim 18, wherein the executable instructions are further executable by the processing element to load a third voice operation trigger phrase in response to determining that the third context applies to the electronic computing device.

20. The system of claim 17, wherein the person comprises at least one person in addition to a user of the electronic computing device being detected in a vicinity of the electronic computing device.

* * * * *